(12) United States Patent
Roy et al.

(10) Patent No.: US 9,730,459 B2
(45) Date of Patent: *Aug. 15, 2017

(54) DOUGH COMPOSITIONS FOR EXTENDED SHELF LIFE BAKED ARTICLES

(71) Applicant: General Mills, Inc., Minneapolis, MN (US)

(72) Inventors: Soumya Roy, Plainville, MA (US); Madonna M Ray, Vadnais Heights, MN (US); Jean L Weber, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 35 days.

This patent is subject to a terminal disclaimer.

(21) Appl. No.: 14/990,412

(22) Filed: Jan. 7, 2016

(65) Prior Publication Data

US 2016/0128344 A1    May 12, 2016

Related U.S. Application Data

(63) Continuation of application No. 11/458,140, filed on Jul. 18, 2006, now Pat. No. 9,241,495.

(Continued)

(51) Int. Cl.
*A21D 10/00* (2006.01)
*A23G 3/00* (2006.01)
(Continued)

(52) U.S. Cl.
CPC .......... *A21D 13/0058* (2013.01); *A21D 2/16* (2013.01); *A21D 2/165* (2013.01); *A21D 2/18* (2013.01);
(Continued)

(58) Field of Classification Search
CPC .......... A23V 2002/00; A23V 2200/224; A23V 2250/06; A23V 2250/0616;
(Continued)

(56) References Cited

U.S. PATENT DOCUMENTS 3,561,975 A    2/1971  Luebering et al.
3,934,040 A    1/1976  Smerak et al.
(Continued)

FOREIGN PATENT DOCUMENTS

DE    3002190    7/1980
EP    0443807    8/1991
(Continued)

OTHER PUBLICATIONS

Gutierrez-Lopez et al., "Recent Development in the Application of Emulsifiers: An Overview", Food Science and Food Biotechnology, p. 257, 2003.

(Continued)

*Primary Examiner* — Erik Kashnikow
*Assistant Examiner* — Lela S Williams
(74) *Attorney, Agent, or Firm* — Diederiks & Whitelaw, PLC; John L. Crimmins, Esq.

(57) ABSTRACT

Dough compositions that can be baked to provide baked articles (e.g., cinnamon rolls) having an extended shelf life of about 7 days or greater (e.g., about 14 days, about 21 days, or about 28 days or greater). The dough composition may be a developed dough compositions or an underdeveloped dough compositions. The dough compositions may include one or more shelf life enhancing agents.

17 Claims, 3 Drawing Sheets

Related U.S. Application Data (60) Provisional application No. 60/700,638, filed on Jul. 19, 2005.

(51) Int. Cl.

| | | |
|---|---|---|
| *A21D 13/00* | (2017.01) | |
| *A21D 2/16* | (2006.01) | |
| *A21D 2/18* | (2006.01) | |
| *A21D 2/24* | (2006.01) | |
| *A21D 2/26* | (2006.01) | |
| *A21D 13/38* | (2017.01) | |
| *A21D 13/16* | (2017.01) | |

(52) U.S. Cl.
CPC ............ *A21D 2/181* (2013.01); *A21D 2/183* (2013.01); *A21D 2/186* (2013.01); *A21D 2/188* (2013.01); *A21D 2/245* (2013.01); *A21D 2/26* (2013.01); *A21D 2/262* (2013.01); *A21D 2/265* (2013.01); *A21D 13/16* (2017.01); *A21D 13/38* (2017.01); *A23V 2002/00* (2013.01)

(58) Field of Classification Search
CPC ...... A23V 2250/76; A21D 2/26; A21D 8/042; A21D 8/047; A21D 13/0067; A21D 2/00; A21D 8/02; A21D 8/06; A21D 10/02; A21D 13/0058
See application file for complete search history.

(56) References Cited

U.S. PATENT DOCUMENTS

| | | | |
|---|---|---|---|
| 4,395,426 A | 7/1983 | Fan | |
| 4,668,519 A | 5/1987 | Dartey et al. | |
| 4,816,282 A | 3/1989 | Kramer et al. | |
| 4,957,750 A | 9/1990 | Cochran et al. | |
| 5,091,200 A | 2/1992 | Kang et al. | |
| 5,133,984 A | 7/1992 | Murphy et al. | |
| 5,458,903 A | 10/1995 | Colson et al. | |
| 5,560,946 A | 10/1996 | Sanders et al. | |
| 5,759,607 A | 6/1998 | Chawan et al. | |
| 5,993,883 A | 11/1999 | Lindsley | |
| 6,042,867 A | 3/2000 | Hoshino et al. | |
| RE36,785 E | 7/2000 | Colson et al. | |
| 6,146,672 A | 11/2000 | Gonzalez et al. | |
| 6,280,782 B1 | 8/2001 | Hahn et al. | |
| 6,335,041 B1 | 1/2002 | Baur et al. | |
| 6,468,569 B1 | 10/2002 | Dunker et al. | |
| 6,589,583 B1 | 7/2003 | Hansen et al. | |
| 6,660,311 B2 | 12/2003 | Goedeken et al. | |
| 7,442,396 B2 | 10/2008 | Casper et al. | |
| 2002/0001655 A1 | 1/2002 | Kuechle et al. | |
| 2002/0192344 A1 | 12/2002 | Brendel et al. | |
| 2003/0072862 A1 | 4/2003 | Pruden et al. | |
| 2003/0157222 A1 | 8/2003 | Henry et al. | |
| 2004/0076716 A1 | 4/2004 | Cooper | |
| 2004/0208957 A1 | 10/2004 | Domingues | |
| 2005/0074534 A1 | 4/2005 | Goedeken et al. | |
| 2005/0147714 A1 | 7/2005 | Domingues et al. | |

FOREIGN PATENT DOCUMENTS

| | | |
|---|---|---|
| EP | 1413202 | 4/2004 |
| JP | 59-137411 | 8/1984 |
| WO | WO 95/07025 | 3/1995 |
| WO | WO 01/78514 | 10/2001 |
| WO | WO 03/024231 | 3/2003 |
| WO | WO 2004/037003 | 5/2004 |
| WO | WO 2005/046334 | 5/2005 |

OTHER PUBLICATIONS

Tsen, "Chemical Dough Development", The Bakers Digest, vol. 47, No. 5, Oct. 1973.
Lallemand Baking Update, "A Guide to Dough Conditioner Ingredients", vol. 1, No. 13.
Fereidoon, "Emulsifiers for Food Applications", Bailey's Industrial Oil and Fat Products, John Wiley & Sons, p. 249, 2005.
Gutierrez-Lopez et al., "Food Science and Food Biotechnology", pp. 26, 2003.
Evers, "Bread-Baking Technology", Technology of Cereals, Woodhead Publishing, pp. 191-217, 1994.
Cauvain, "Breadmaking", Cereals Processing Technology, Woodhead Publishing, pp. 204-230, 2001.
International Food Information Service, XP-002407394.
PCT International Search Report for PCT/US2006/027720 (7 pages).

DOUGH COMPOSITIONS FOR EXTENDED SHELF LIFE BAKED ARTICLES

CROSS-REFERENCES TO RELATED APPLICATIONS

This application represents a continuation of U.S. patent application Ser. No. 11/458,140, filed Jul. 18, 2006, now U.S. Pat. No. 9,241,495, which claims the benefit of priority under 35 U.S.C. §119(e)(1) of a U.S. provisional patent application, Ser. No.: 60/700,638, filed Jul. 19, 2005, both of which are incorporated herein by reference in their entirety.

FIELD

The invention relates to dough compositions that can be baked to provide baked articles having an extended shelf life.

BACKGROUND

Baked articles such as sweet rolls, muffins, cakes, pie crusts, doughnuts, and the like are typically made from dough compositions comprising flour, water, and leavening agents (e.g., yeast or a chemical leavening agent). After baking, the baked articles go through a change that makes them organoleptically less acceptable to consumers. This change is typically referred to as staling, and can include both flavor loss and loss of crumb softness. Staling occurs when the starch molecules crystallize or "retrograde." Starch retrogradation refers to a process where molecules of gelatinized starch reassociate in an ordered structure. In the initial phase, two or more starch molecular chains form a simple juncture point that develops into more extensively ordered regions. Ultimately, this crystalline ordering causes the baked article to become stale.

Conventionally, preservatives and humectants have been used to retard staling and improve the shelf life of baked articles. Although these materials can be effective, improved dough compositions that can be baked to form baked articles having an extended shelf life are highly desirable.

SUMMARY

The invention provides dough compositions that can be baked to provide baked articles (e.g., cinnamon rolls) having an extended shelf life of about 7 days or greater (e.g., about 14 days or greater, about 21 days or greater, or about 28 days or greater). As used herein the term "shelf-life" refers to the shelf life of a baked article after baking. A shelf life of a given number of days (e.g., 7 days) refers to the number of days, after baking, that the baked article substantially retains its initial flavor profile, texture characteristics, bacterial deterioration, and is free from visible mold growth.

In one aspect, the dough composition is a developed dough composition comprising encapsulated L-cysteine. In some embodiments, the dough composition further includes a moisture control agent selected from fructose or hydroxy propyl methyl cellulose.

In another embodiment, the dough composition comprises:
(a) encapsulated L-cysteine; and
(b) two or more shelf life extending agents selected from:
  (i) a moisture control agent, such as a hydrogenated starch hydroslyate or a non-gelling hydrocolloid (e.g., maltodextrin or hydroxy propyl methyl cellulose);
  (ii) a plasticizer, such as a prehydrated monoglyceride or a laminated fat; and
  (iii) artificial flour.

For example, the dough composition comprises may comprise a moisture control agent and a plasticizer; a moisture control agent and artificial flour; or a plasticizer and artificial flour.

In some embodiments, the developed dough composition comprises three or more shelf life extending agents. For example, the dough composition may comprise two moisture control agents and a plasticizer; two moisture control agents and artificial flour; a moisture control agent and two plasticizers; or a moisture control agent, a plasticizer, and artificial flour.

In some embodiments, the developed dough composition may comprise four or more shelf life extending agents, or five or more shelf life extending agents. In an exemplary embodiment, the developed dough composition comprises: encapsulated L-cysteine; a prehydrated monoglyceride; a laminated fat; a hydrogenated starch hydrosylate; hyroxy propyl methyl cellulose; and artificial flour.

In another aspect, the invention provides an under-developed dough composition that can be baked to provide a baked article having an extended shelf life. In one embodiment, the under-developed dough composition comprises:
(a) a prehydrated propylene glycol alginate or albumin; and
(b) a moisture control agent selected from fructose or hydoxy propyl methyl cellulose.

In another embodiment, the invention provides an under-developed dough composition comprising:
(a) a prehydrated propylene glycol alginate; and
(b) two or more shelf life extending agents selected from:
  (i) a plasticizer, such as a prehydrated monoglyceride or a laminated fat;
  (ii) a moisture control agent, such as a hydrogenated starch hydrosylate or a non-gelling hydrocolloid (e.g., maltodextrin or hydroxy propyl methyl cellulose); and
  (iii) artificial flour.

For example, the dough composition may comprise a moisture control agent and a plasticizer; a moisture control agent and artificial flour; or a plasticizer and artificial flour.

In some embodiments, the under-developed dough composition comprises three or more shelf life extending agents. For example, the under-developed dough composition may comprise two moisture control agents and a plasticizer; two moisture control agents and artificial flour; a moisture control agent and two plasticizers; or a moisture control agent, a plasticizer, and artificial flour.

In some embodiments, the under-developed dough composition may comprise four or more shelf life extending agents or five or more shelf life extending agents. In an exemplary embodiment, the under-developed dough composition comprises: prehydrated propylene glycol alginate; albumin; a prehydrated monoglyceride; laminated fat; a hydrogenated starch hydrosylate; hyroxy propyl methyl cellulose; and artificial flour.

Developed or under-developed dough compositions of the invention typically comprise flour, water, and yeast and may optionally include one or more chemical leavening agents. When included, the artificial flour comprises modified wheat starch and vital wheat gluten.

In another aspect, the invention provides baked articles (e.g., cinnamon rolls) comprising a baked dough composition of the invention. In an exemplary embodiment, the baked article is a cinnamon roll comprising a cinnamon smear. In some embodiments, the cinnamon smear is resistant to boil-off and comprises at least one of methyl cellulose or hyroxy propyl methyl cellulose. In exemplary embodiments, the smear further includes xanthan, carrageenan, and microcrystalline and/or carboxymethyl cellulose. In many embodiments, the cinnamon roll further includes a laminated layer of fat.

DETAILED DESCRIPTION

The embodiments of the present invention described herein are not intended to be exhaustive or to limit the invention to the precise forms disclosed in the following detailed description. Rather, the embodiments are chosen and described so that others skilled in the art can appreciate and understand the principles and practices of the present invention.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

In one aspect, the invention provides a developed dough composition that can be baked into a baked article having enhanced shelf life. According to the invention, the developed dough composition comprises encapsulated L-cysteine and may additionally include one or more additional shelf life enhancing agents.

In one embodiment, the developed dough compositions comprises:
(a) encapsulated L-cysteine; and
(b) two or more shelf life extending agents selected from:
  (i) a moisture control agent, such as a hydrogenated starch hydroslyate (HSH) or a non-gelling hydrocolloid (e.g., maltodextrin or hydroxy propyl methyl cellulose (HPMC));
  (ii) a plasticizer, such as a prehydrated monoglyceride or a laminated fat; and
  (iii) artificial flour.

The shelf life extending agents may be selected from the same group (e.g., two plasticizers or two moisture control agents) or they may be selected from different groups (e.g., one plasticizer and one moisture control agent). In some embodiments, the developed dough comprises three or more shelf life extending agents, four or more shelf life extending agents, or five or more shelf life extending agents. For example, the developed dough composition may comprise a moisture control agent, a plasticizer, and artificial flour.

In an exemplary embodiment, the developed dough composition comprises: encapsulated L-cysteine; a prehydrated monoglyceride; a laminated fat; a hydrogenated starch hydrosylate; hyroxy propyl methyl cellulose; and artificial flour.

In another embodiment of the invention, the developed dough composition comprises: (a) encapsulated L-cysteine; and (b) a moisture control agent, such as fructose or hydroxy propyl methyl cellulose (HPMC). In another embodiment of the invention, the developed dough composition comprises:
(a) encapsulated L-cysteine; (b) a moisture control agent, such as a hydrogenated starch hydroslyate (HSH) or a non-gelling hydrocolloid (e.g., maltodextrin or hydroxy propyl methyl cellulose (HPMC)); and (c) a plasticizer, such as a prehydrated monoglyceride or a laminated fat.

In another aspect, the invention provides an under-developed dough composition that can be baked to provide a baked article having an enhanced shelf life. In one embodiment, the under-developed dough composition comprises: (a) a prehydrated propylene glycol alginate (PGA) and/or albumin; and (b) a moisture control agent, such as fructose or hydoxy propyl methyl cellulose. In another embodiment, the under-developed dough composition comprises: (a) a prehydrated propylene glycol alginate (PGA); (b) a plasticizer, such as a prehydrated monoglyceride or laminated fat; and (c) a moisture control agent, such as a hydrogenated starch hydrosylate (HSH).

In another embodiment, the under-developed dough composition comprises:
(a) a prehydrated propylene glycol alginate (PGA); and
(b) two or more shelf life extending agents selected from the following:
  (i) a plasticizer, such as a prehydrated monoglyceride or laminated fat;
  (ii) a moisture control agent, such as a hydrogenated starch hydrosylate (HSH), or a non-gelling hydrocolloid (e.g., maltodextrin or hydroxy propyl methyl cellulose (HPMC)); and
  (iii) artificial flour.

In some embodiments, the under-developed dough comprises three or more of shelf life extending agents. The shelf life extending agents may be selected from the same group (e.g., two plasticizers) or they may be selected from different groups (e.g., a plasticizer and a moisture control agent).

In an exemplary embodiment, the under-developed dough comprises prehydrated propylene glycol alginate; albumin; a prehydrated monoglyceride; laminated fat; hydrogenated starch hydrosylate; hyroxy propyl methyl cellulose; and artificial flour.

The developed or under-developed dough compositions of the invention can be baked to provide baked articles having an extended shelf life. Generally speaking, as the dough composition includes more shelf life extending agents, the shelf life of the baked dough composition is lengthened. For example, in some embodiments of the invention, the dough composition is baked to provide a baked article, such as a cinnamon roll, that has a shelf life of about 7 days or greater, or about 14 days or greater, or about 21 days or greater, or about 28 days or greater.

Dough compositions of the invention may be "developed" or the may be "under-developed." The degree of development of a dough composition (as in a "developed" versus an "under-developed" dough) generally refers to the strength of a dough's matrix, as the strength relates to the degree of development of gluten (protein) in the dough composition. During processing of a dough composition, gluten can be caused or allowed to interact or react and "develop" a dough composition in a way that increases the stiffness, strength, and elasticity of the dough composition. Dough compositions commonly referred to as "developed" are generally understood to include those that have a relatively highly-developed gluten matrix structure; a stiff, elastic rheology; and (due to the stiff, elastic matrix) are able to form bubbles or cells that can stretch without breaking to hold a leavening gas while the dough composition expands, leavens, or rises, prior to or during cooking (e.g., baking). Features that may be associated with a developed dough composition, in addition to a stiff, elastic rheology, include a liquid content (e.g., water content) that is relatively high compared to under-developed dough compositions; a sufficient (e.g., relatively high) protein content to allow for a highly-developed structure; optionally, processing steps that include time to allow the dough-forming ingredients to interact and develop to strengthen the dough. As compared to "developed" dough compositions, dough compositions commonly referred to as "under-developed" (or "non-developed") have a relatively less developed dough matrix that gives the dough composition a relatively non-elastic rheology, reduced strength, and reduced gas-holding capacity. An under-developed dough composition may be prepared, for example, by mixing the dough composition only enough to incorporate all the ingredients without fully developing the gluten.

A tool to quantify the nature of the extent of development of the dough is a farinograph, which is a common flour and dough quality measuring device that measures the resistance of the dough to mixing (reported in Brabender units (B.U.)). As dough is mixed, the resistance to mixing increases until a peak is reached, after which the resistance to mixing decreases. In underdeveloped dough, the mixing process is stopped before it reaches its peak. Dough is typically considered to be developed when the resistance to mixing reaches a maximum on the farinograph.

In embodiments where the dough composition is a developed composition, L-cysteine or encapsulated L-cysteine may be added to the dough composition in order to reduce or break at least some of the di-sulfide bonds formed during development of the dough. The breaking of di-sulfide bonds functions to soften the baked article thereby increasing its shelf life.

In some embodiments, L-cysteine is provided in an encapsulated form so that it does not interact with the ingredients making up the dough composition during development. When the dough composition is proofed and baked, the L-cysteine is released from its encapsulated form allowing it to break at least some of the di-sulfide bonds that were formed during development of the dough composition. In other embodiments, L-cysteine (i.e., non-encapsulated L-cysteine) is added very near the end of the dough making process in order to limit its interaction during development.

The term "encapsulated L-cysteine" refers to L-cysteine particulates covered at least in part, normally completely or substantially completely, by an encapsulating agent (sometimes also referred to as "barrier material."). The encapsulating agent forms a coating or shell around a single or multiple particulates of L-cysteine.

Encapsulating the L-cysteine provides separation between the L-cysteine and the bulk of the dough composition. Still, encapsulating processes and encapsulating agents do not normally result in perfect encapsulation of L-cysteine. Instead, cracks or open areas of coatings of encapsulating material normally allow at least some small amount of the L-cysteine to be exposed. Further, encapsulated particles of L-cysteine may sometimes be damaged during preparation of a dough composition, such as during mixing of ingredients. The result of such imperfect encapsulation is that some amount of L-cysteine is released from encapsulation into a dough composition, prior to baking, e.g., during preparation or processing of a dough composition or during refrigerated storage. According to embodiments of the invention, the amount of L-cysteine that is released due to imperfect encapsulation can be as high as 50%. In order to reduce the pre-mature release of L-cysteine, it is recommended to add the L-cysteine near the end of the mixing process.

The degree of encapsulation can be discussed in various terms. The degree of encapsulation refers to how well particulates of L-cysteine are covered by or enclosed by an encapsulating agent, and, therefore, the effectiveness with which an encapsulating agent coating separates the L-cysteine from a bulk dough composition prior to baking. Features that provide a high degree of encapsulation include a high percentage of coverage of L-cysteine particulates by encapsulating agent, a low amount of cracking of the encapsulating agent, and a low amount of damage to encapsulated particles. Conversely, a low degree of encapsulation can exist if there is a low percentage of coverage of L-cysteine particulates by a barrier material, a high amount of cracks in the barrier material coating, or a large degree of damage to encapsulated particles.

One measure that may be useful to quantify degree of encapsulation is "activity," which refers to the percentage by weight of L-cysteine that is contained in encapsulated particles, based on the total weight of the particles. According to the invention, an activity of approximately 60% is desired in the encapsulated L-cysteine.

Examples of useful activities of encapsulated L-cysteine, when included in a developed dough composition of the invention can be, e.g., in the range from 50% to 90% percent, e.g., in the range from 58% to 62%.

The encapsulating agent can be any material that can be coated as an encapsulating agent to provide encapsulated particles that exhibit the desired separation and release. Upon baking, the encapsulating agent degrades (e.g., melts) to release substantially all of the encapsulated L-cysteine. Thus, an encapsulating agent may exhibit a melting point that causes the encapsulating agent to take the form of a stable solid at dough preparation, packaging, and storage temperatures, and that causes the encapsulating agent to break down (e.g., melt) during baking. If oven temperature during baking is generally about 300° F. to 500° F. (148.9° C. to 260° C.), exemplary melting points of encapsulating agents are generally lower, e.g., greater than 100° F. (37.8° C.), so that a melting point is somewhat higher than refrigerated storage or room temperature, and is a temperature that the dough composition experiences during baking, but is not necessarily the temperature of the set point of the oven during baking. A more specific range of melting points can be within the temperature range experienced by the dough composition during early stages of baking, such as from about 100° F. (37.8° C.) to about 200° F. (93.3° C.).

Exemplary encapsulating agents include hydrophobic materials, such as fats and emulsifiers. Examples of useful encapsulating agents include oils, such as hydrogenated vegetable oils, including hydrogenated soybean oil, hydrogenated cotton oil, hydrogenated palm oil, hydrogenated palm kernel oil, hydrogenated canola oil, or any other hydrogenated vegetable oils, any of which may be used alone or in mixtures. Synthetic analogs of any of these may also be useful.

Encapsulated particles containing L-cysteine can be prepared by methods known in the baking and encapsulation arts. An example of a method for producing enrobed particles is the use of a fluidized bed. According to this method, core particulates and encapsulating agent are concurrently introduced into a fluidized bed. As the two materials are present in the fluidized bed, the encapsulating agent becomes coated on the surface of the core particulate. The longer the particulate is present in the fluidized bed, the thicker the coating of encapsulating agent becomes. Typical particles can include 1, 2, or 3 particulates per encapsulated particle. To prepare encapsulated particles containing basic chemical leavening with a desired degree of encapsulation (e.g., activity) parameters of encapsulation can be controlled to affect amount of coverage (e.g., the amount and thickness of the barrier material).

The amount of encapsulated L-cysteine used in a dough composition may be in the range from about 0.006% to about 0.03% weight percent based on the total weight of a dough composition, e.g., from 0.01% to 0.03% weight, from 0.012% to 0.02% weight, or from 0.015% to 0.018% weight. In some embodiments, the encapsulated L-cysteine comprises about 60% weight L-cysteine and about 40% weight encapsulant. In such embodiments, the encapsulated L-cysteine is added in an amount ranging from about 0.01% to about 0.05% weight of the dough composition.

Suitable encapsulated L-cysteine can be obtained commercially under the trade designation "BAKESURE 512" (from Balchem Corporation, New Hampton, N.Y.). The L-cysteine HCL monohydrate comprises about 58 to 62% weight of the encapsulated product. The encapsulant is a vegetable oil based coating.

Rather than reducing di-sulfide bonds after they have been formed (e.g., using encapsulated L-cysteine), in some embodiments, the number of di-sulfide bonds in the dough composition is intentionally limited by forming an under-developed dough. In under-developed dough, the dough composition is not allowed to fully develop, for example, by stopping the mixing before the dough reaches peak resistance (e.g., as measured using a Farinograph). As development of di-sulfide bonds is assisted by the presence of water, the addition of hygroscopic materials (e.g., hydrogenated starch hydrolysates) also restricts the development of the dough composition.

When the dough is under-developed, a processing aid is typically added to stabilize the structure of the under-developed dough. In some embodiments, the processing aid is a hydrocolloid, such as prehydrated propylene glycol alginate (PGA). Propylene glycol alginate comprises repeating segments of mannuronic and guluronic acid and is produced by reacting alginic acid (derived from seaweed) with propylene oxide. Typically, PGA is added to the dough composition in an amount up to about 0.5% by weight (e.g., about 0.04% to about 0.12% weight). A suitable PGA is commercially available under the trade designation "KELCOLOID FO" (from ISP Alginates, San Diego, Calif.). Prior to addition to the under-developed dough composition, the PGA may be dissolved in water using a high shear mixer to provide a solution of about 2.5% weight PGA in water.

In some embodiments, the processing aid is albumin. Albumin (i.e., egg white) is added to stabilize the structure of the dough composition and to reduce the interaction between the gluten and the starch in the dough. Albumin is a simple protein (i.e., a substance that yields only alpha-amino acids or their derivatives on hydrolysis) that is soluble in water or dilutes salt solutions. Albumins include ovalbumins (from egg white), serum albumin (from blood serum), lactalbumin (from milk), and vegetable albumin (e.g., leucosin of wheat and legumulin of peas) (from plant tissue). Typically, albumin is added to the dough composition in an amount up to about 5% weight (e.g., about 4% or less; about 3% or less; about 2% or less; or about 1% or less by weight). Typically, the albumin will be added in the second cycle along with other dry ingredients. In some embodiments, the albumin is added by the addition of whole eggs.

According to the invention a number of shelf life extending agents have been identified that may be used alone or in combination with one another, in developed or under-developed dough compositions of the invention, to provide an extended shelf life. Generally speaking, as the number of shelf life extending agents increases, the shelf life of the resulting baked dough composition also increases. In some embodiments, two or more (e.g., 3, 4, 5, 6, or more) shelf life extending agents are included in the dough composition. Shelf life extending agents may be classified, for example, as plasticizers or moisture control agents. The various shelf life extending agents are described in more detail below.

In some embodiments, the developed or under-developed dough compositions comprise one or more moisture control agents. Moisture control agents act "macroscopically" to reduce the loss of moisture from a baked article to its surrounding atmosphere. In addition, moisture control agents may act on the molecular level to: (1) improve resistance to starch retrogradation; and/or (2) to reduce the interaction between gluten and starch. Retrograded starch (i.e., re-crystallized starch) due to its crystalline nature and due to the expulsion of water, increases the firmness of the baked article causing it to become stale.

In some embodiments, the dough composition of the invention comprises a hydrogenated starch hydrolysate (HSH). Hydrogenated starch hydrolysates are composed of a variety of polyols of different length chains. HSH are produced by the partial hydrolysis of corn, wheat or potato starch and subsequent hydrogenation of the hydrolysate at high temperature under pressure. The end product is an ingredient composed of sorbitol, maltitol and higher hydrogenated saccharides (maltitriitol and others). By varying the conditions and extent of hydrolysis, the relative occurrence of various mono-, di-, oligo- and polymeric hydrogenated saccharides in the resulting product can be obtained. They are typically prepared, for example, by the controlled catalytic hydrogenation of corn syrups. The resulting hydrogenated starch hydrolysates are mixtures of monomeric, dimeric, and polymeric saccharides. The ratio of these different saccharides gives different hydrogenated starch hydrolysates different properties.

In some embodiments, the hydrogenated starch hydrolysate is present in the dough composition in an amount up to about 5% weight (e.g., about 4% or less; about 3% or less; about 2% or less; or about 1% or less by weight). Suitable hydrogenated starch hydroslysates include those commercially available under the trade designations "STABILITE SD 30" and "STABILITE 60" (from SPI Polyols, New Castle, Del.). STABILITE SD 30 has a polyol distribution of: HP1 (sorbitol) 2%; HP2(maltitol) 6%; and HP3 92%. STABILITE SD 60 has a polyol distribution of: HP1(sorbitol) 1%; HP2(maltitol) 3.5%; and HP3 95.5%.

In some embodiments, the dough composition comprises a hydrogenated starch hydrolysate (HSH) and fructose. These materials sterically hinder the recrystallization of starch, thereby retarding starch retrogradation. In addition, fructose also functions to lower the water activity in the baked dough. Hydrogenated starch hydrolysates also provide the baked dough with a perception of moistness.

When present, the dough composition will typically include up to about 8% weight fructose (e.g., about 7% or less; about 6% or less; about 5% or less; about 4% or less; about 3% or less; about 2% or less; or about 1% or less). Fructose may be obtained commercially, for example, under the trade designation "KRYSTAR 300" (from Tate & Lyle).

In some embodiments of the invention, moisture retention is improved by the presence of a non-gelling hydrocolloid. Although not wishing to be bound by theory, non-gelling hydrocolloids are believed to function to improve moisture retention by restricting the migration of moisture in the baked article. In addition, a hygroscopic non-gelling hydrocolloid may also be included in the dough composition for another purpose. Although not wishing to be bound by theory, it is believed that hygroscopic non-gelling hydrocolloids (e.g., maltodextrin) may absorb water that is expelled over time by the protein in the baked article. Without the presence of a hygroscopic non-gelling hydrocolloid, the expelled water would be expected to be absorbed by the starch, which would facilitate its re-orientation and crystallization. Crystallization of the starch adversely affects the shelf life stability of the baked article. With the addition of a hygroscopic non-gelling hydrocolloid, the expelled water is absorbed rather than being available to facilitate crystallization of the starch.

One example of a non-gelling hydrocolloid is maltodextrin. Maltodextrin is an easily digestible carbohydrate (i.e., a polymer of dextrose) that is derived from corn starch. The corn starch is cooked and acid and/or enzymes are used to break the starch into smaller polymers. Maltodextrin may be categorized by its dextrose equivalence (DE). DE is a measure of reducing power compared to a dextrose standard of 100. The higher the DE, the greater the extent of starch depolymerization, resulting in a smaller average polymer size. Maltodextrins that are more hygroscopic (e.g., 5DE maltodextrins) are preferred over less hygroscopic maltodextrins (e.g., 1DE maltodextrins). Maltodextrin is typically provided as a white hygroscopic powder.

A useful maltodextrin is commercially available under the trade designation "STAR-DRI" (from Tate & Lyle). Typically, maltodextrin is used in the dough composition of the invention in an amount up to about 5% weight (e.g., about 4% or less; about 3% or less; about 2% or less; or about 1% or less by weight).

Another example of a non-gelling hydrocolloid is hydroxy propyl methyl cellulose (HPMC). HPMC is typically added to the dough composition in an amount up to about 0.5% weight (e.g., about 0.4% or less; about 0.3% or less; about 0.2% or less; or about 0.1% or less by weight). HPMC is typically added to the dough composition during the second cycle of the mixing process. A useful HPMC is commercially available under the trade designation "METHOCEL K4M" (from Dow Chemical Co.).

Developed or under-developed dough compositions of the invention may comprise one or more plasticizers as described below.

In some embodiments, the dough composition comprises a prehydrated monoglyceride. A monoglyceride is a lipid molecule in which only one of the primary hydroxyl groups of glycerol has been esterified to a fatty acid. Monoglycerides may be represented by the general chemical formula:

where: —R is a fatty acid.

Monoglycerides are surface active substance due to the presence of both polar (water-soluble) and nonpolar (water-insoluble) groups. A prehydrated monoglyceride is one that has been dissolved in water prior to adding it to the dough composition. Although not wishing to be bound by theory, it is believe that the prehydration of the monoglyceride increases its hydophillic nature thereby causing it to interact with starch (i.e., rather than interacting with lipids) in the dough composition.

A suitable monoglyceride is commercially available under the trade designation "GMS 90 DOUBLE STRENGTH #285 (from American Ingredients Co., Kansas City, Mo.).

Monoglycerides are typically included in the dough composition of the invention in an amount ranging from about 4% to about 8% weight.

In some embodiments, the monoglyceride is in clathrate form. As used herein the term "clathrate" refers to a chemical substance consisting of a lattice of one type of molecule trapping and containing a second type of molecule. Clathrates are formed when the monoglycerides are caged within the water matrix in a more structured fashion than typically exist, for example, in prehydrated monoglycerides. As a result, clathrates are more effective at preventing retrogradation than prehydrated monoglycerides. Because of the short stability of the clathrates, they are typically prepared within about 24 hours of the time they are added to the dough composition. Clathrates may be prepared, for example, by heating water to about 90° F. (32.2° C.); thoroughly mixing the monoglyceride into the heated water (typically about 1 part monoglyceride is added to about 2 parts water); and heating the mixture to about 115° F. (46.1° C.) to about 120° F. (48.9° C.) while stirring very slowly. The mixture forms a soft gel upon cooling. As clathrates are more effective at preventing retrogradation, they need only be added to the dough composition at about 2% weight or less to be effective.

In some embodiments, moisture migration can be reduced and/or the perception of moistness may be improved by forming the dough composition (and the resulting baked article) into a laminated structure including a rolled-in layer of fat. As used herein the term "laminated" refers to a baked article having alternating layers of dough and fat. Commonly, cinnamon rolls are provided in a spiral laminate. The rolled-in fat component is added to the dough composition by laminating the dough and roll-in fat component in alternating layers. The amount of fat added by virtue of the roll-in component typically ranges from about 0 to about 13% by weight (e.g., about 4% to about 7% weight in developed dough compositions and about 5% to 13%, or about 5% to 10% in under-developed dough compositions). Useful fats for making dough laminates include, for example, shortening, butter, or margarine.

In some embodiments, the dough composition comprises artificial flour comprising modified wheat starch (that is resistant to retrogradation) and vital wheat gluten. An example of modified wheat starch that is resistant to retrogradation is a pregelatinized wheat starch commercially available under the trade designation "PREGEL 46" (from MGP Ingredients, Inc., Atchison Kans.). Other modified wheat starches, for example, cook-up starched that are resistant to retrogradation can also be used. The artificial flour (total of pregelatinized wheat starch and vital wheat gluten) is typically included in the dough composition in an amount up to about 10% weight. Suitable vital wheat gluten is commercially available under the trade designation "PROVIM ESP" from (ADM Food Ingredients, Decatur, Ill.).

Dough compositions of the invention comprise hard wheat flour and may optionally include one or more other types of flour. Suitable hard wheat flour comprises about 11% to about 15% protein in order to provide strength and stability to developed dough compositions of the invention. Optionally, the hard wheat flour may be combined with one or more other types of flour in order to provide the composition with other desirable attributes, for example, desirable textural characteristics, nutritional values, and the like. Representative examples of other flours include soft wheat flour (i.e., having about 8% to about 11% protein), rye flour, oat flour, and the like. Dough compositions of the invention typically comprise up to about 45% weight hard wheat flour based on the total weight of the dough composition. Hard wheat flour may be obtained commercially from such sources as ADM Milling; Bay State Milling Co.; Conagra Inc.; General Mills, Inc.; Horizon Milling, LLC; and Rohstein Corp.

Dough compositions of the invention include liquid components, for example, water, milk, eggs, and oil, or any combination of these. Water is typically present in dough compositions of the invention to provide the dough composition with the desired rheology. Water may be added during processing in the form of ice, to control the dough temperature during processing; the amount of any such water used is included in the amount of liquid components. The precise amount of water depends on factors known to those skilled in the dough making art including, for example, whether the dough composition is a developed or under-developed composition.

Water is typically present in dough compositions of the invention in an amount ranging up to about 30% weight (e.g., about 8% to 18% weight for under-developed dough compositions, and about 18% to 28% weight for developed dough compositions). A portion of the water may be used to prehydrate certain components (e.g., monoglycerides or PGA).

In developed compositions, the amount of water from all sources, for example, water, eggs, milk, etc. should not be so high that the dough composition becomes soft and cannot maintain its desired closed-cell structure including bubbles of carbon dioxide and water vapor. Also, the amount of water should not be so low that the dough composition is dry and has no ability to expand.

Dough compositions can be caused to expand (leaven) by any leavening mechanism, such as by one or more of the effects of: entrapped gas, such as entrapped carbon dioxide, entrapped oxygen, or both; by action of chemical leavening agents; or by action of a biological agent, such as a yeast. Thus, a leavening agent may be an entrapped gas, such as layers or cells (bubbles) that contain carbon dioxide, water vapor, or oxygen, etc.; any type of yeast (e.g., cake yeast, cream yeast, dry yeast, etc.); or a chemical leavening system (e.g., containing a basic chemical leavening agent and an acidic chemical leavening agent that react to form a leavening gas, such as carbon dioxide).

Dough compositions of the invention may be yeast-leavened. As used herein the term "yeast-leavened" refers to dough compositions that are leavened primarily due to the production of gaseous metabolited by yeast; chemical leavening agents may optionally be present, but in minor amounts, preferably less than about 10% by weight chemical leavening agent based on the total weight of the leavening agent (yeast and chemical leavening agent) or may not be present at all.

The yeast may be any suitable yeast known to those of skill in the art, for example, fresh cream/liquid yeast, fresh compressed yeast, active dry yeast, and instant yeast. In some embodiments, the yeast is fresh compressed yeast (e.g., in cake or crumbled form) comprising about 65% to about 75% water and about 25% to about 35% yeast. The amount of yeast can be an amount that will produce a desired volume of gaseous metabolites, as known to one of skill in the art. Typically, the amount of yeast present in the dough composition is up to about 10% by weight (e.g., about 2% to about 8% weight for developed dough compositions, and less than about 1% to about 5% weight for under-developed compositions).

In some embodiments a chemical leavening agent may be used in addition to yeast. Acidic chemical leavening agents (or acid agents) that may be useful include those generally known in the dough and bread-making arts. Acidic agents may be relatively soluble within different temperature ranges and may or may not be encapsulated. Examples of acidic agents include sodium aluminum phosphate (SALP), sodium acid pyrophosphate (SAPP), monosodium phosphate, monocalcium phosphate monohydrate (MCP), anhydrous monocalcium phosphate (AMCP), dicalcium phosphate dehydrate (DCPD), glucono-delta-lactone (GDL), an others. Commercially available acidic chemical leavening agents include those sold under the trade designations "LEVN-LITE" (SALP); "PAN-O-LITE" (SALP+MCP); "STABIL-9" (SALP+AMPC); "PY-RAN" (AMCP); and "HT MCP" (MCP).

The dough composition may also include an encapsulated basic chemical leavening agents. Useful basic chemical leavening agents are known in the dough and bread-making arts, and include soda (i.e., sodium bicarbonate, $NaHCO_3$), potassium bicarbonate ($KHCO_3$), ammonium bicarbonate ($NH4HCO_3$), etc. Encapsulating the basic chemical leavening agent provides separation between the basic agent and the bulk of the dough composition. If present, chemical leavening agents typically comprises less than about 1% weight of the dough composition (e.g., less than about 0.5% weight or less than about 0.3% weight).

Dough compositions of the invention may optionally include one or more fat components that are added to the dough composition at the time the dough is prepared and are substantially interspersed and distributed throughout the dough composition. The amount of fat in the dough product due to the mixed-in fat component will depend upon the type of dough composition being prepared, but will typically be about 10% weight or less (e.g., about 1% to about 5%; or about 2% to about 3%). The type of fat in a dough composition of the invention is not particularly limited, and may be derived from vegetable, dairy and marine sources including butter oil or butterfat, soybean oil, corn oil, rapeseed or canola oil, copra oil, cottonseed oil, fish oil, safflower oil, olive oil, sunflower oil, peanut oil, palm oil, palm kernel oil, coconut oil, rice bran oil and other plant derived oils, such as vegetable or nut oils. Examples of shortenings include animal fats, such as lards, butter and hydrogenated vegetable oils, such as margarine. Mixtures of different fats may also be used.

The dough composition may optionally include one or more sweeteners, natural or artificial, liquid or dry. If a liquid sweetener is used, the amount of other liquid components may be adjusted accordingly. Examples of suitable dry sweeteners include lactose, sucrose, fructose, dextrose, maltose, corresponding sugar alcohols, and mixtures thereof. Examples of suitable liquid sweeteners include high fructose corn syrup, malt, and hydrolyzed corn syrup. Often, dough compositions include up to about 8% by weight sweetener.

The dough composition may optionally include additional flavorings, for example, salt, such as sodium chloride and/or potassium chloride; whey; malt; yeast extract; inactivated yeast; spices; vanilla; natural and artificial flavors; etc.; as is known in the dough product arts. The additional flavoring can typically be included in an amount in the range from about 0.1 weight percent to about 10 weight percent of the dough composition, e.g., from about 0.2 to about 5 weight percent of the dough composition.

The dough composition may optionally include particulates, such as raisins, currants, fruit pieces, nuts, seeds, vegetable pieces, and the like, in suitable amounts.

The dough composition may optionally include other additives, colorings, and processing aids, for example, gliadin (e.g., less than about 1% to improve extensibility in under-developed dough), emulsifiers include lecithin, diglycerides, polyglycerol esters, and the like, (e.g., diacetylated tartaric esters of monoglyceride (DATEM) and sodium stearoyl lactylate (SSL)).

An exemplary developed dough composition of the invention is set forth in TABLE 1 below.

TABLE 1

| Ingredient | Broad Range (% weight) | Narrow Range (% weight) |
|---|---|---|
| Hard wheat flour | 30 to 45 | 35 to 43 |
| Water (or ice) | 18 to 28 | 21 to 25 |
| Shortening (mixed-in) | 1 to 5 | 2 to 3 |
| Yeast | 2 to 8 | 3 to 4 |
| Salt | 0.5 to 1.3 | 0.75 to 1.0 |
| Non-fat dry milk | 0 to 4 | 0.75 to 1.0 |
| Sweet whey solids | 0 to 4 | 2 to 2.5 |
| Fructose | 0 to 8 | 1.6 to 2.0 |
| Vital wheat gluten | 0 to 4 | 2.5 to 3.1 |
| Modified wheat starch | 0 to 4 | 1.7 to 2.2 |
| Prehydrated monoglyceride (50% in water) | 2 to 8 | 1.8 to 2.2 |
| Albumin | 0 to 3 | 0.9 to 1.1 |
| Hydroxy propyl methyl cellulose | 0.05 to 0.3 | 0.08 to 0.1 |
| Encapsulated L-cysteine (60% active) with shell | 0.01 to 0.05 | 0.025 to 0.035 |
| Maltodextrin | 0 to 3 | 1.7 to 2.0 |
| Hydrogenated starch hydrosylate | 0 to 3 | 1.25 to 1.55 |
| α-amylase | 0 to 0.02 | 0.009 to 0.013 |
| SSL | 0 to 0.3 | 0.17 to 0.21 |
| Sodium acid pyrophosphate | 0 to 0.3 | 0.14 to 0.18 |
| Sodium bicarbonate | 0 to 0.3 | 0.14 to 0.18 |
| Encapsulated sorbic acid | 0 to 0.2 | 0.07 to 0.09 |
| Encapsulated fumaric acid | 0 to 0.3 | 0.14 to 0.17 |
| Corn syrup | 0 to 8 | 4 to 5 |
| Shortening (rolled-in) | 0 to 13 | 4 to 7 |

Although an optimum mixing procedure will vary according to the mixer design and the batch size, a exemplary developed dough composition of the invention may be prepared as follows.

First, the flour, yeast, shortening and water (in the form of liquid water and/or ice to control temperature) are added to a mixer. The ingredients are mixed on low speed for about 60 seconds, followed by mixing on high speed to peak development (e.g., for about 350 to about 450 seconds). Next, the dry ingredients (e.g., fructose, sweet whey solids, albumin, salt, NFDM, SSL, modified starch, SAPP, soda, HPMC, encapsulated fumaric acid, encapsulated sorbic acid, α-amylase) along with the prehydrated monoglyceride are added and mixed for about 30 seconds on slow speed, followed by about 60 seconds on high speed. In the $3^{rd}$ cycle, corn syrup is added and mixed on slow speed for about 60 seconds, followed by about 2 minutes on high speed. In the $4^{th}$ cycle, the HSH, encapsulated L-cystein, and maltodextrin are added and mixed for about 60 seconds on slow speed, followed by about 2 minutes on high speed. The farinograph reading of the finished developed dough is typically about 750 to about 950 BU.

An exemplary under-developed dough composition of the invention is set forth in TABLE 2.

TABLE 2

| Ingredient | Broad Range (% weight) | Narrow Range (% weight) |
|---|---|---|
| Hard wheat flour | 20 to 35 | 23 to 28 |
| Yeast | 1 to 5 | 3 to 4 |
| Water (or ice) | 8 to 18 | 12 to 16 |
| Dextrose | 0 to 4 | 2 to 3 |
| Salt | 0.5 to 1 | 0.5 to 0.75 |
| Egg (Albumin) | 0 to 5 | 2.5 to 3.5 |
| Fructose | 0 to 8 | 3 to 4 |
| Sucrose | 0 to 5 | 1 to 2 |
| Vital wheat gluten | 0 to 3 | 1 to 2 |
| Pregelatinized wheat starch | 0 to 6 | 2 to 4 |
| Margarine | 0 to 6 | 3 to 5 |
| Maltodextrin | 0 to 4 | 1 to 2 |
| Hydroxy propyl methyl cellulose | 0 to 0.2 | 0.03 to 0.04 |
| HSH | 0 to 3 | 1 to 2 |
| Hydrated Monoglyceride (excluding water) | 0 to 5 | 1 to 2 |
| Prehydrated propylene glycol alginate (solids only) | 0.04 to 0.12 | 0.05 to 0.08 |
| Sodium caseinate | 0 to 2 | 0.05 to 0.08 |
| Sodium acid pyrophosphate | 0 to 0.3 | 1.1 to 1.4 |
| Sodium stearoyl lactylate | 0 to 0.3 | 0.12 to 0.15 |
| Sodium bicarbonate | 0 to 0.3 | 0.12 to 0.15 |
| Encapsulated fumaric acid | 0.01 to 0.003 | 0.013 to 0.016 |
| Encapsulated sorbic acid | 0.05 to 0.2 | 0.08 to 0.1 |
| Maltogenic α-amylase | 0 to 0.02 | 0.007 to 0.009 |
| Shortening (rolled-in) | 5 to 13 | 5 to 10 |

Although an optimum mixing procedure will vary according to the mixer design and the batch size, a exemplary under-developed dough composition of the invention may be prepared as follows.

Step 1: Hydration of PGA: Propylene glycol alginate (PGA) is hydrated by first heating a sample of water to about 180° F. (82.2 C) and slowly adding the PGA to the hot water while mixing at high shear (e.g., using a LIGHTNING or TEKMAR type mixer). The solution is typically mixed for about 10 minutes. The resulting solution is desirably free from visible lumps and fish eyes.

Step 2: Monoglyceride Hydration: Water is heated to approximately 90° F. (32.2° C.) and the monoglyceride is added to the heated water and is mixed in by stirring with a spatula. The resulting mixture is then heated to a temperature of about 115° F. (46.1° C.) to 120° F. (48.9° C.) using a microwave. Upon cooling, the hydrated monoglyceride forms a soft gel.

Step 3: Preparation of Sugar Slurry: A sugar slurry may be prepared as follows. First, the dry minor ingredients of the sugar slurry (i.e., fructose, dextrose, SSL, sucrose, sodium caseinate, salt, and albumin) are pre-blended. A charge of water is then added to a mixer. Under high speed mixing, the pre-blended dry ingredient are slowly added to the water. Mixing is continued until the lumps have been dispersed. Under high speed mixing, the pre-hydrated PGA is added and is mixed for about 2 minutes. Next, under high speed mixing, the prehydrated monoglycerides are added. The slurry is mixed at high speed until free of lumps and undissolved ingredients.

Step 4: Dough Mixing Procedure: Water/ice, gluten, modified wheat starch, flour, soy flour, margarine, a-amylase, yeast, SAPP, and soda are added to a mixing bowl and are mixed for about 60 seconds on slow speed, followed by about 200 to about 350 seconds on high speed. Next, the sugar slurry is added and is mixed in for about 60 seconds on slow speed, followed by about 200 to about 350 seconds on high speed. Finally, the HSH, encapsulated sorbic acid, and ascorbic acid (optional) are added and are mixed in for about 60 seconds on slow speed, followed by about 90 to 180 seconds on high speed.

In some embodiments, the baked articles of the invention comprise a smear (e.g., a cinnamon smear) or filling that is resistant to boil-off (i.e., loss of the smear due to baking induced boiling) during baking of the roll and has other desirable properties. For example, in some embodiments, the smear or filling acts as an adhesive to reduce and/or prevent gaps from forming between adjacent laminated layers in the baked article, for example, a laminated cinnamon roll. In other embodiments, the filling may be in any baked good where the prevention of gaps is desirable, for example, caramel rolls, danishes, pizza rolls, filled donuts, and filled cookies.

Figure 1:
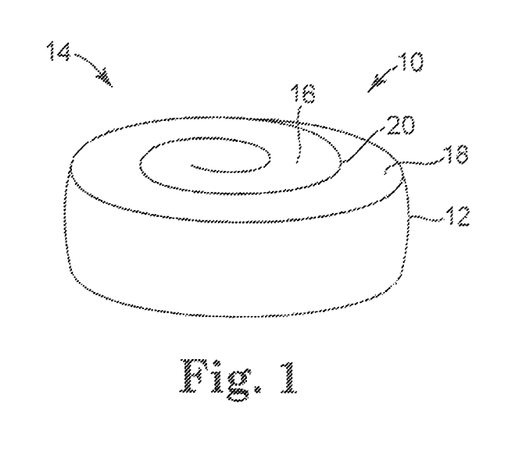
FIG. 1 is a perspective view of an embodiment of a laminated cinnamon roll of the invention.

Referring to FIG. 1, a perspective view of an exemplary laminated cinnamon roll is shown. Cinnamon roll 10 includes baked dough layer 12 that is formed in a spiral shape 14. The spiral shape 14 of baked dough layer 12 creates adjacent dough layers in the cinnamon roll, for example, layers 16 and 18. Interposed between adjacent layers 16 and 18 is a smear (i.e., a thin coating) of cinnamon filling 20. Cinnamon filing 20 acts as an adhesive to adhered adjacent layers (e.g., layers 16 and 18) together in order to prevent the formation of gaps.

In some embodiments, the smear comprises an ingredient (e.g., methyl cellulose or hydroxy propyl methyl cellulose) that exhibits increased viscosity with increased temperature. Such an ingredient improves the resistance to boil-off of the cinnamon smear. The smear also typically includes xanthan and carrageeenan in effective amounts to provide a desired viscosity, for example, a room temperature viscosity of about 10,000 cps to about 25,000 cps.

In some embodiments, the smear comprises hydroxy propyl methyl cellulose, methyl cellulose, microcrystalline and/or carboxymethyl cellulose, maltodextrin, starch, xanthan, and carrageenan In an exemplary embodiment, the smear comprises about 0.2% to about 0.4% weight carrageenan; about 0.1% to about 0.3% weight xanthan; about 2% to about 5% weight maltodextrin; about 0.1% to about 0.5% weight microcrystalline cellulose; about 0.1% to about 0.6% weight hydroxy propyl methyl cellulose; and about 0% to about 0.11% weight sodium alginate. Sodium alginate can be obtained commercially under the trade designation "KELCOSOL" (from ISP Alginates). Carrageenan can be obtained commercially under the trade designation "VIS-CARIN 3840" (from FMC). Maltodextrin can be obtained commercially under the trade designation "MALTRIN M040" (from Grain Process Corp.). Hydroxy propyl methyl cellulose can be obtained commercially under the trade designation "METHOCEL" (from Dow Chemical Co.). Pregelatinized wheat starch can be obtained commercially available under the trade designation "PREGEL 46" (from MGP Ingredients, Inc., Atchison KS).

A exemplary cinnamon smear formulation is set forth in TABLE 3.

TABLE 3

| INGREDIENT | AMOUNT (% wt.) |
| --- | --- |
| Sodium Alginate | 0 to 0.11 |
| Carrageenan | 0.2-0.4 |
| Xanthan | 0.1-0.3 |
| Maltodextrin | 2-5 |
| Microcrystalline cellulose and/or carboxymethyl cellulose | 0.1-0.5 |

TABLE 3-continued

| INGREDIENT | AMOUNT (% wt.) |
| --- | --- |
| Methyl cellulose or hydroxy propyl methyl cellulose | 0.1-0.6 |
| Dextrose | 5-15 |
| Margarine | 8-15 |
| Distilled Monoglycerides | 0.5-2 |
| High Fructose Corn Syrup | 15-25 |
| Cinnamon | 3-8 |
| Cinnamon Danish Flavor | 0.1-0.5 |
| Sucrose | 10-25 |
| Molasses, Liquid | 0.5-2 |
| Brown sugar flavor | 0.05-0.3 |
| Wheat flour | 1-6 |
| Modified Wheat Starch | 1-4 |

Although an optimum mixing procedure will vary according to the mixer design and the batch size, a exemplary cinnamon smear may be prepared as follows.

First, a preblend of dry ingredients is prepared including the distilled monoglyceride, xanthan, wheat flour, modified wheat starch, cinnamon, and maltodextrin. Next, the carrageenan and alginate (if present) are pre-hydrated by adding them to about 50 times their weigh in hot water (e.g., about 180° F. (82.2° C.)) under high shear mixing. Next, a dispersion of micro-crystalline cellulose and hydroxy propyl methyl cellulose in corn syrup is prepared. Then, margarine, sucrose, and dextrose are added to the mixer. These ingredients are mixed on low speed for about 30 seconds, followed by medium speed for about 3 minutes. Next, the pre-blended dry ingredients are added and the resulting composition is mixed on low speed for about 1 minute, followed by medium speed for about 1 minute. Next, the flavoring and molasses are added and the resulting composition is mixed on low speed for about 15 seconds. Next, the corn syrup dispersion is added slowly while mixing on low speed, followed by medium speed for about 1 minute. Finally, the carrageenan and alginate pre-hydrate is added while mixing on low speed for about 1 minute. The resulting composition is mixed for about 2 minutes on medium speed.

Once the dough composition has been prepared, it can be further processes according to known methods of forming a dough composition into a desired size and shaped, followed by other processing steps, for example, packaging, freezing, and cooking. A variety of techniques can be used for processing. For example, processing of the dough composition can include one or more of sheeting, extruding, dividing, rounding, etc.

Cinnamon rolls of the invention may be formed according to known methods and typically include about 70 grams of the dough composition and about 25 grams of cinnamon smear. After preparing the cinnamon rolls they may be proofed, for example, at a temperature of about 90° F. (32.2° C.) and a wet bulb of about 85° F. (29.4° C.) for about 45 to 60 minutes. Following proofing, the cinnamon rolls may be baked, for example, for about 25 to 35 minutes at about 350° F. (176.7° C.). After baking, a solution of about 5% K-Sorbate may be applied to the baked rolls using a sprayer. After the rolls have cooled to less than about 90° F. (32.2° C.) (surface temperature) they are typically frozen by placing them in a blast freezer for about 20 to 30 minutes. The frozen rolls can be packaged according to known methods and stored in frozen storage, for example, at about −10° F. (−23.3° C.).

Additional dough compositions having an enhanced shelf life are described in U.S. Provisional Patent Application Ser. No. 60/700,697 entitled "DOUGH COMPOSITIONS AND BAKED ARTICLES MADE THEREFROM" and bearing Attorney Docket No. GMI0037P1; filed Jul. 19, 2005.

The present invention will be described below with reference to the following representative examples, wherein unless otherwise indicated; all percentages are weight percentages based upon the total weight of the dough composition. Furthermore, although the following examples illustrate the invention by the description of the production of cinnamon rolls including cinnamon smear fillings, other dough products are also within the scope of the invention, for example, doughnuts, Danishes, toaster pastries, coffeecakes, sweet rolls, Bismarcks, cookies, bagels, biscuits, scones, dinner rolls, breads, croissants, egg twists, bread sticks, and the like.

EXAMPLES

Example 1

Figure 2:
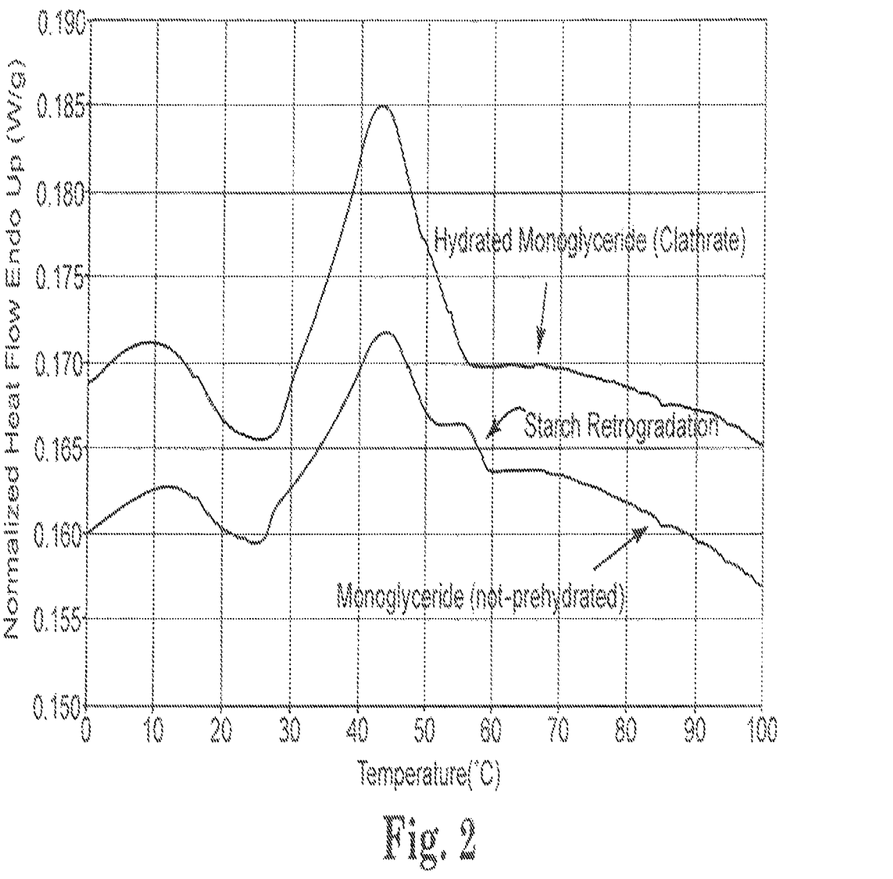
FIG. 2 is a DSC thermogram of certain dough compositions.

Prehydration increases the hydrophilic nature of emulsifiers. If emulsifiers are not prehydrated they may interact with fat more. As a result, less is available for restricting starch recrystallization. FIG. 2 is a DSC thermogram of two dough compositions where one includes a hydrated monoglyceride and the other includes a monoglyceride that was not prehydrated. The peak for fat melting is reduced when the monoglyceride was added without prehydration. This demonstrates that the monoglyceride is interacting more with fat when it is not prehydrated.

Example 2

Figure 3:
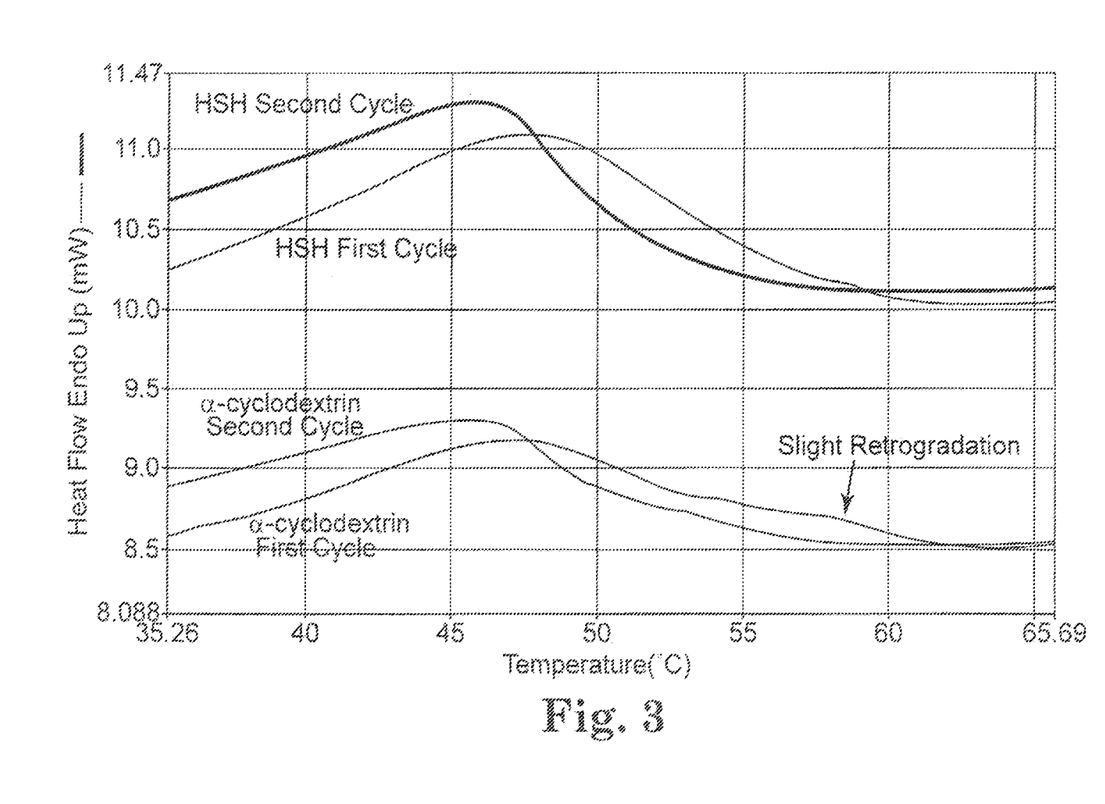
FIG. 3 is a DSC thermogram of certain dough compositions.

The effect of a hydrogenated starch hydrolysate (HSH) and alpha-cyclodexrin on starch retrogradation was compared using differential scanning calorimietry (DSC). The samples were heated twice in order to identify starch retrogradation. The absence of a peak in the second cycle originally present in the first cycle shows amylopectin retrogradation. FIG. 3 is a DSC thermogram of the dough compositions. A slight retrogradation peak was observed at about 58° C. (14.4° C.) in the sample containing alpha-cyclodextrin. No retrogradation peak was observed with HSH indicating it to be a more effective anti-stalling agent.

Example 3

This example demonstrates that the introduction of fat lamination (i.e., using roll-in fat) results in extended shelf life as characterized by improved moisture retention and softness in a baked article. Hardness and cohesiveness were measured using TAXTPlus Texture Analyzer (from Stable Microsystems, Surrey, UK). The results are presented in TABLE 4.

TABLE 4

| Weeks of Storage | Oil (5.5%) in Dough Hardness (N) | Oil (5.5%) in Dough Cohesiveness | Oil (2%) and Laminated (5%) Hardness (N) | Oil (2%) and Laminated (5%) Cohesiveness |
|---|---|---|---|---|
| 0 | 37.8 | 0.486 | 52.0 | 0.442 |
| 2 | 42.8 | 0.449 | 68.1 | 0.428 |
| 3 | 62.6 | 0.400 | 60.0 | 0.433 |
| 4 | 92.6 | 0.363 | 75.4 | 0.426 |

Example 4

Hygroscopic non-gelling hydrocolloids (e.g., maltodextrin) that are added to dough compositions acts to absorb moisture expelled by the gluten, thereby restricting the starch-gluten interaction. Hygroscopic 5DE maltodextrin was found to give a softer texture and moister product than less hygroscopic 1DE maltodextrin. Hardness was measured using TAXTPlus Texture Analyzer (from Stable Microsystems, Surrey, UK). Water activity was measured using Aqualab (from Decagon Devices, Inc., Pullman, Wash.). The results are presented in TABLE 5.

TABLE 5

| Weeks | 1DE Maltodextrin Hardness | 1DE Maltodextrin Water Activity | 5DE Maltodextrin Hardness | 5DE Maltodextrin Water Activity |
|---|---|---|---|---|
| 1 | 64.2 | 0.866 | 33.2 | 0.852 |
| 2 | 91.2 | 0.845 | 60.3 | 0.838 |
| 3 | 84.0 | — | 66.7 | — |
| 4 | 89.0 | 0.845 | 70.1 | 0.863 |

Example 5

This example demonstrates that the use of modified starch and gluten in a ratio close to common flour extends the shelf life of baked articles. A dough composition comprising about 13% artificial flour (consisting of 10% modified starch and 3% gluten) was compared to a formulation comprising standard flour. Hardness and chewiness were measured using TAXTPlus Texture Analyzer (from Stable Microsystems, Surrey, UK). The results are presented in TABLE 6.

TABLE 6

| Weeks | Standard Flour Hardness (g) | Standard Flour Chewiness | 13% Artificial Flour Hardness | 13% Artificial Flour Chewiness |
|---|---|---|---|---|
| 2 | 11961 | 2079 | 19356 | 3411 |
| 3 | 12654 | 2436 | 18763 | 3064 |
| 4 | 14576 | 2720 | 20256 | 3250 |

Example 6

A test panel made up of 120 people rated cinnamon rolls for appearance; texture; tenderness; and overall liking. A 9-point hedonic scale was used with a score of 9 indicating extreme liking of the product, and a score of 1 indicating extreme disliking of the product for the rated response. The cinnamon rolls tested included an under-developed dough of the invention, which was tested at 2 days (Sample 1) and at 21 days (Sample 2) post-bake. A 2 day post-bake gourmet cinnamon roll (Control) was also tested. The results are presented in TABLE 7. The results showed no significant difference in the liking scores between the 2 day (Sample 1) and 21 day old (Sample 2) cinnamon rolls of the invention.

TABLE 7

| | Sample 1 | Sample 2 | Control |
|---|---|---|---|
| Overall | 6.4 | 6 | 5.9 |
| Appearance | 6.2 | 6.2 | 6.8 |
| Texture | 6.1 | 5.6 | 5.3 |
| Tenderness | 5.8 | 5.3 | 4.8 |

All publications, patents and patent documents are incorporated by reference herein, as though individually incorporated by reference. The invention has been described with reference to specific and preferred embodiments and techniques. However, other embodiments of this invention will be apparent to those skilled in the art upon consideration of this specification or from practice of the invention disclosed herein. Various omissions, modifications, and changes to the principles and embodiments described herein may be made by one skilled in the art without departing from the true scope and spirit of the invention which is indicated by the following representative embodiments.

What is claimed is:

1. A developed dough composition comprising:
   a dough matrix; and
   encapsulated L-cysteine, wherein the developed dough composition contains the encapsulated L-cysteine and no non-encapsulated L-cysteine.

2. The developed dough composition of claim 1, wherein the encapsulated L-cysteine includes L-cysteine particulates and an encapsulating agent, with the encapsulating agent having a melting point that allows the encapsulating agent to melt during baking.

3. The developed dough composition of claim 2, wherein the encapsulating agent has a melting point in a range of 100° F. -200° F.

4. The developed dough composition of claim 2, wherein the encapsulating agent is hydrophobic.

5. The developed dough composition of claim 4, wherein the encapsulating agent is a hydrogenated vegetable oil.

6. The developed dough composition of claim 2, wherein the encapsulating agent forms a coating on surfaces of the L-cysteine particulates to separate the L-cysteine particulates from the dough matrix and prevent interaction of the L-cysteine with ingredients of the dough matrix prior to the developed dough composition being cooked.

7. The developed dough composition of claim 2, wherein the encapsulated L-cysteine comprises about 60 weight percent of the L-cysteine particulates and 40 weight percent of the encapsulating agent.

8. The developed dough composition of claim 1, wherein the dough matrix constitutes a raw dough matrix.

9. The developed dough composition of claim 1, wherein the encapsulated L-cysteine comprises from 0.01%-0.05% by weight of the developed dough composition.

10. The developed dough composition of claim 9, wherein the encapsulated L-cysteine comprises from 0.025%-0.035% by weight of the developed dough composition.

11. The developed dough composition of claim 1, wherein the dough matrix comprises a mixture of dough ingredients including flour, water, sweetener and yeast, with the encapsulated L-cysteine being distributed throughout the mixture.

12. The developed dough composition of claim 1, wherein the developed dough composition further comprises two or more shelf life extending agents selected from:
   (i) a moisture control agent selected from a hydrogenated starch hydrolysate or a non-gelling hydrocolloid;
   (ii) a plasticizer selected from a prehydrated monoglyceride or a laminated fat; and
   (iii) artificial flour.

13. The developed dough composition of claim 1, further comprising:
   a moisture control agent selected from fructose or hydroxy propyl methyl cellulose.

14. The developed dough composition of claim 12, wherein the moisture control agent comprises a non-gelling hydrocolloid comprising maltodextrin or hydroxy propyl methyl cellulose.

15. The developed dough composition of claim 12, wherein the developed dough composition comprises:
   a prehydrated monoglyceride;
   a laminated fat;
   a hydrogenated starch hydrolysate;
   hydroxy propyl methyl cellulose; and
   artificial flour.

16. A cinnamon roll comprising the developed dough composition of claim 1, wherein the cinnamon roll has a shelf life of 7 days or greater.

17. The cinnamon roll of claim 16, wherein the cinnamon roll has a shelf life of 28 days or greater.

* * * * *